(12) United States Patent
Kuhns

(10) Patent No.: US 11,756,396 B2
(45) Date of Patent: Sep. 12, 2023

(54) SYSTEMS AND METHODS FOR REDUCING GRAIN THEFT IN HARVESTING OPERATIONS

(71) Applicant: Philip Kuhns, Westmoreland, TN (US)

(72) Inventor: Philip Kuhns, Westmoreland, TN (US)

(*) Notice: Subject to any disclaimer, the term of this patent is extended or adjusted under 35 U.S.C. 154(b) by 259 days.

(21) Appl. No.: 17/374,622

(22) Filed: Jul. 13, 2021

(65) Prior Publication Data

US 2023/0018114 A1 Jan. 19, 2023

(51) Int. Cl.
| | | |
|---|---|---|
| *G08B 13/14* | (2006.01) | |
| *H04L 9/40* | (2022.01) | |
| *A01D 43/07* | (2006.01) | |

(52) U.S. Cl.
CPC ......... *G08B 13/1472* (2013.01); *A01D 43/07* (2013.01); *H04L 63/0428* (2013.01)

(58) Field of Classification Search
CPC .. G08B 13/1472; A01D 43/07; H04L 63/0428
See application file for complete search history.

(56) References Cited

U.S. PATENT DOCUMENTS

| | | | |
|---|---|---|---|
| 8,634,765 B2 | 1/2014 | Plamondon | |
| 8,789,563 B2 | 7/2014 | Wenzel | |
| 9,119,342 B2* | 9/2015 | Bonefas | ................. A01D 75/02 |
| 9,128,867 B2 | 9/2015 | Cawse et al. | |
| 9,268,911 B2 | 2/2016 | Sia et al. | |
| 9,529,364 B2* | 12/2016 | Foster | .................. A01B 69/004 |
| 9,820,436 B2* | 11/2017 | Inoue | ................. A01D 41/1274 |
| 10,143,132 B2* | 12/2018 | Inoue | ................. A01D 41/1272 |
| 10,234,562 B2 | 3/2019 | Janky et al. | |
| 10,945,367 B2* | 3/2021 | Inoue | ................. A01D 41/1208 |
| 11,188,098 B2* | 11/2021 | Desai | .................... G05D 1/0291 |
| 11,315,052 B2* | 4/2022 | Chanasyk | ........ G06Q 10/06313 |
| 11,372,402 B2* | 6/2022 | Desai | .................... B60W 10/20 |
| 2003/0182259 A1 | 9/2003 | Pickett et al. | |

(Continued)

FOREIGN PATENT DOCUMENTS

| | | |
|---|---|---|
| JP | 2006061104 A | 3/2006 |
| JP | 2019121116 A | 7/2019 |

OTHER PUBLICATIONS

Eurasian Search Report completed Jan. 12, 2023 for Eurasian Application No. 202291805, 3 pages.

*Primary Examiner* — Hoi C Lau
(74) *Attorney, Agent, or Firm* — Dickinson Wright PLLC

(57) ABSTRACT

Systems and methods for theft reduction of grain are disclosed. A grain cart includes a theft detection system that monitors grain onboarded into the grain cart from a harvesting machine, and grain offloaded from the grain cart to a trailer. The theft detection system measures a weight value of the grain received from the harvesting machine, and transmits the weight value to a tracking system. Additionally, the theft detection system can receive an expected grain weight value from the harvesting machine and compare the measured weight value with the received weight value, and provide a notification (e.g., alarm) of the difference is greater than a predetermined threshold. The theft detection system can provide similar functions between weight values of grain in the grain cart and a trailer. Also, the theft detection system can encrypt transmit the weight values prior to transmitting to the tracking system.

26 Claims, 10 Drawing Sheets

(56) References Cited

U.S. PATENT DOCUMENTS

| | | | |
|---|---|---|---|
| 2006/0169776 A1* | 8/2006 | Hornbaker | G06K 19/04 340/572.1 |
| 2008/0077320 A1 | 3/2008 | Loftus et al. | |
| 2008/0278314 A1 | 11/2008 | Miller et al. | |
| 2011/0092158 A1 | 4/2011 | Plamondon | |
| 2012/0200697 A1* | 8/2012 | Wuestefeld | H04N 7/18 198/810.01 |
| 2014/0311113 A1* | 10/2014 | Bonefas | A01D 75/02 56/10.2 R |
| 2014/0333453 A1 | 11/2014 | Sia et al. | |
| 2014/0372166 A1* | 12/2014 | Chanasyk | G06Q 10/06313 705/7.23 |
| 2015/0205308 A1 | 7/2015 | Huat | |
| 2015/0264866 A1* | 9/2015 | Foster | B65G 67/24 414/21 |
| 2017/0031840 A1 | 2/2017 | Cawse et al. | |
| 2017/0075354 A1 | 3/2017 | Putkonen et al. | |
| 2018/0242521 A1* | 8/2018 | Thomson | B65G 65/34 |
| 2019/0095358 A9 | 3/2019 | Cawse et al. | |
| 2019/0361148 A1 | 11/2019 | Ulmer et al. | |
| 2020/0319632 A1* | 10/2020 | Desai | B60P 1/00 |
| 2020/0319655 A1* | 10/2020 | Desai | A01B 69/008 |
| 2022/0156670 A1* | 5/2022 | Issrani | B62B 5/0096 |
| 2022/0228902 A1* | 7/2022 | Von Muenster | G01G 15/006 |
| 2022/0228906 A1* | 7/2022 | Von Muenster | G01G 23/14 |
| 2023/0018114 A1* | 1/2023 | Kuhns | A01D 43/07 |
| 2023/0108200 A1* | 4/2023 | Von Muenster | G01G 19/08 177/1 |

\* cited by examiner

SYSTEMS AND METHODS FOR REDUCING GRAIN THEFT IN HARVESTING OPERATIONS

BACKGROUND

Harvesting operations generally require multiple vehicles. In an exemplary process, a harvesting machine cuts a crop and stores the crop in a bin. Then, a cart moves alongside the harvesting machine while the harvesting machine empties the crop into the cart. After that, the cart empties the crop into a trailer, and the trailer is subsequently hauled to a storage facility such as an elevator or a silo.

While several advances in the vehicles can lead to a more efficient harvesting operation, there are some drawbacks. For example, the "chain of custody" of the crop from machine to machine is susceptible to crop theft, as each transfer of the crop from one machine to another gives various persons—machine operators, farm workers, or other nefarious actors—an opportunity to steal the crop. As the crop is transferred from one machine to another, it is difficult to visually determine whether any crop is stolen. Currently, most crop recording is done manually and is done so near the end stage of the crop transfer process, i.e., at the storage facility. Accordingly, when the crop is stolen at an earlier stage, it is difficult to tell at which stage(s) it was stolen, and who is responsible party/parties for stealing the crop.

SUMMARY

An aspect of the present disclosure is related to a method for transferring grain in a grain cart during a harvesting operation. The method includes receiving a first harvester identity of a first harvesting machine. The receiving is performed by a theft detection system disposed on the grain cart. The method continues with receiving the grain into a grain bin of the grain cart from the first harvesting machine. The method continues with determining a first weight value indicative of weight of grain received into the grain bin from the first harvesting machine. The determining is performed by a sensing device disposed on the grain cart and communicatively coupled to the theft detection system. The method continues with transmitting the first weight value and the first harvester identity to a tracking system remotely located from the grain cart. The transmitting is performed by the theft detection system using a satellite data communication protocol. Also, the transmitting is at least partially in an encrypted form.

In an embodiment, receiving the first harvester identity further includes receiving, by a short-range wireless communication protocol, the first harvester identity.

In an embodiment, receiving the first harvester identity further includes reading, by a camera system coupled to the theft detection system, identifying indicia of the first harvesting machine.

In an embodiment, reading the identifying indicia further includes at least one selected from a group that includes reading a number visible on the first harvesting machine, reading a bar code disposed on the first harvesting machine, reading a one-dimensional bar code disposed on the first harvesting machine, reading a two-dimensional bar code disposed on the first harvesting machine, and reading a word visible on the first harvesting machine.

In an embodiment, receiving the first harvester identity further includes receiving, by way of a short-range wireless communication protocol, the first harvester identity from a portable communication device of an operator of a tractor pulling the grain cart.

In an embodiment, the method continues with receiving an offload trailer identity of an offload trailer. The receiving is performed by the theft detection system. The method continues with offloading grain from the grain bin to the offload trailer. The method continues with determining an offload weight value indicative of weight of grain offloaded from the grain bin to the offload trailer. The determining is performed by the sensing device communicatively coupled to the theft detection system. The method continues with transmitting the offload weight value and the offload trailer identity to the tracking system. The transmitting is performed by the theft detection system using the satellite data communication protocol, and the transmitting at least partially in encrypted form.

In an embodiment, receiving the offload trailer identity further includes receiving, by a short-range wireless communication protocol, the offload trailer identity.

In an embodiment, receiving the offload trailer identity further includes reading, by a camera system coupled to the theft detection system, identifying indicia of the offload trailer.

In an embodiment, reading the identifying indicia further includes at least one selected from a group that includes reading a number visible on the offload, reading a bar code disposed on the offload trailer, reading a one-dimensional bar code disposed on the offload trailer, reading a two-dimensional bar code disposed on the offload trailer, and reading a word visible on the offload trailer.

In an embodiment, receiving the offload trailer identity further includes receiving, by way of a short-range wireless communication protocol, the offload trailer identity from a portable communication device of an operator of a tractor pulling the grain cart.

In an embodiment, the method continues with offloading grain from the grain bin to the offload trailer. The method continues with offloading grain from the grain bin to the offload trailer. The method continues with determining an offload weight value indicative of weight of grain offloaded from the grain bin to the offload trailer. The determining is performed by the sensing device communicatively coupled to the theft detection system. The method continues with, subsequent to the grain being offloaded from the grain bin to the offload trailer, obtaining an offload weight value indicative of weight of grain provided to the offload trailer from the grain bin. The method continues with, subsequent to the grain being offloaded from the grain bin to the offload trailer, sending an alarm to the tracking system if a difference between the offload weight value and the onboarded weight value is greater than a predetermined threshold. The sending is performed by the theft tracking system using the satellite data communication module.

In an embodiment, the method continues with continually monitoring a cumulative weight value of indicative of weight of grain in the grain bin. The monitoring is performed by the theft detection system and the sensing device. The method continues with sending an alarm to the tracking system if the grain is offloaded from the grain bin in an absence of receiving an offload trailer identity.

In an embodiment, the method continues with obtaining an offload weight value indicative of weight of grain provided from the first harvesting machine. The obtaining is performed by the theft detection system from a communication module of the first harvesting machine and using the short-range wireless communication protocol. The method continues with sending an alarm to the remote tracking system if a difference between the first weight value and the offload weight value is greater than predetermined threshold. The sending is performed by the theft tracking system using the satellite communication protocol.

In an embodiment, the method continues with receiving a second harvester identity of a second harvesting machine. The receiving is performed by the theft detection system disposed on the grain cart. The method continues with receiving grain into the grain bin of the grain cart from the second harvesting machine. The method continues with determining a second weight value indicative of weight of grain received into the grain bin from the second harvesting machine. The determining is performed by the sensing device communicatively coupled to the theft detection system. The method continues with transmitting the second weight value indicative of weight of grain and the identity of the second harvesting machine to the tracking system. The transmitting is performed by the theft detection system using the satellite data communication protocol. Also, the transmitting is at least partially in the encrypted form.

In an embodiment, determining the first weight value by way of the sensing device further includes using at least one selected from a group that includes an image sensing device, a weight sensor, and a flow rate sensor.

According to another aspect of the present disclosure, a grain cart for transferring grain in a harvesting operation is disclosed. The grain cart includes a frame. The grain cart further includes a grain bin mounted on the frame. The grain cart further includes a sensing device configured to determine a weight value indicative of weight of grain in the grain bin. The grain cart further includes a theft detection system coupled to the frame. The theft detection system includes a satellite data communication module. The theft detection system further includes a controller coupled to the sensing device. The controller is configured to receive a harvester identity of a harvesting machine. The controller is further configured to determine a weight value indicative of weight of grain received into the grain bin from the harvesting machine. The determination uses the sensing device. The controller is further configured to transmit the weight value and the harvester identity to a tracking system remotely located from the grain cart. The transmitting uses the satellite data communication module. Also, the transmitting is at least partially in an encrypted form.

In an embodiment, the theft detection system further includes a short-range data communication module coupled to the controller. The controller is further configured to receive the harvester identity. The receiving is performed by way of the short-range data communication module.

In an embodiment, the theft detection system further comprises a camera system operatively coupled to the controller, and the controller is further configured to read identifying indicia of the harvesting machine by way of the camera system.

In an embodiment, the controller is further configured to read the identifying indicia selected from a group that includes a number visible on the harvesting machine, a bar code disposed on the harvesting machine, a one-dimensional bar code disposed on the harvesting machine, a two-dimensional bar code disposed on the harvesting machine, and a word visible on the harvesting machine.

In an embodiment, the theft detection system further includes a short-range data communication module coupled to the controller. The controller is further configured to receive the harvester identity from a portable communication device of an operator of a tractor pulling the grain cart. The receiving is performed by way of the short-range data communication module.

In an embodiment, the controller is further configured to receive an offload trailer identity of an offload trailer. The controller is further configured to determine, using the sensing device, an offload weight value indicative of weight of grain offloaded from the grain bin to the offload trailer. The controller is further configured to transmit, using the satellite data communication protocol, the offload weight value and the offload trailer identity to the tracking system.

In an embodiment, the theft detection system further includes a short-range data communication module coupled to the controller. The controller is further configured to receive, using the short-range data communication module, the offload trailer identity.

In an embodiment, the theft detection system further includes a camera system operatively coupled to the controller. The controller is configured to read identifying indicia of the offload trailer by way of the camera system.

In an embodiment, the controller is further configured to read the identifying indicia selected from a group that includes a number visible on the offload, a bar code disposed on the offload trailer, a one-dimensional bar code disposed on the offload trailer, a two-dimensional bar code disposed on the offload trailer, and a word visible on the offload trailer.

In an embodiment, the theft detection system further includes a short-range data communication module coupled to the controller. The controller is further configured to receive the offload trailer identity from a portable communication device of an operator of a tractor pulling the grain cart. The receiving is performed by way of the short-range data communication module.

In an embodiment, the controller is further configured to, subsequent to the grain being offloaded from the grain bin to the offload trailer, obtain an onboarded weight value indicative of weight of grain provided to the offload trailer from the grain bin. The controller is further configured to, subsequent to the grain being offloaded from the grain bin to the offload trailer, send an alarm to the tracking system if a difference between the offload weight value and the onboarded weight value is greater than a predetermined threshold. The sending is performed by the theft tracking system using the satellite data communication protocol.

In an embodiment, the controller is further configured to use the sensing device to continually monitor a cumulative weight value of indicative of weight of grain in the grain bin. The controller is further configured to send an alarm to the tracking system if grain is offloaded from the grain bin in the absence of receiving an offload trailer identity.

In an embodiment, the theft detection system further includes a short-range wireless communication module coupled to the controller. The controller is further configured to obtain an offload weight value indicative of weight of grain provided from the harvesting machine. The obtaining is performed by way of the short-range wireless communication module. The controller is further configured to send, using, an alarm to the tracking system if a difference between the first weight value and the offload weight value is greater than predetermined threshold. The sending is performed by way of the satellite communication protocol.

In an embodiment, the theft detection system further includes a short-range data communication module coupled to the controller. The controller is further configured to receive, from the harvesting machine, an expected weight value of indicative of weight of grain to be received in the grain bin from the harvesting machine. The receiving is performed by way of the short-range data communication module. When the grain is received from the harvesting machine, the controller is further configured to determine, using the sensing device, an actual weight value of indicative of weight of grain received from the harvesting machine. The determining is performed by way of the sensing device. When the grain is received from the harvesting machine, the controller is further configured to send an alarm to the tracking system if a difference between the expected weight value and the actual weight value is greater than a predetermined threshold. The sending is performed by way of the satellite data communication module.

In an embodiment, the sensing device includes one selected from a group that includes an image sensing device, a weight management system; and a flow rate sensor.

According to another aspect of the present disclosure, a grain cart for transferring grain in a harvesting operation is disclosed. The grain cart includes a frame. The grain cart further includes a grain bin carried by the frame. The grain cart further includes a weight sensor mounted between the frame and the grain bin. The weight sensor is configured to determine a weight value indicative of weight of grain in the grain bin. The grain cart further includes a theft detection system coupled to the frame. The theft detection system includes a controller coupled to the weight sensor. The controller is configured to receive a harvester identity of a harvesting machine. The controller is further configured to determine a first weight value indicative of weight of grain received into the grain bin from the harvesting machine. The determination uses the weight sensor. The controller is further configured to receive, when the grain is offloaded to a trailer, a second weight first weight value indicative of weight of grain offloaded from the grain bin to the trailer. The controller is further configured to receive a trailer identity of the trailer. The controller is further configured to encrypt information corresponding to the first weight value, the second weight value, the harvester identity, and the trailer identity. The controller is further configured to transmit the encrypted information.

In an embodiment, the theft detection system further comprises a camera system operatively coupled to the controller. The controller is further configured to read identifying indicia of the harvesting machine and the trailer by way of the camera system.

In an embodiment, the theft detection system further comprises a satellite data communication module. The controller is further configured to transmit the encrypted information by way of the satellite data communication module.

In an embodiment, the theft detection system further comprises a short-range data communication module coupled to the controller. The controller is further configured to receive the harvester identity and the trailer identity. The receiving is performed by way of the short-range data communication module.

BRIEF DESCRIPTION OF THE DRAWINGS

For a detailed description of example embodiments, reference will now be made to the accompanying drawings in which.

DEFINITIONS

Figure 1A:
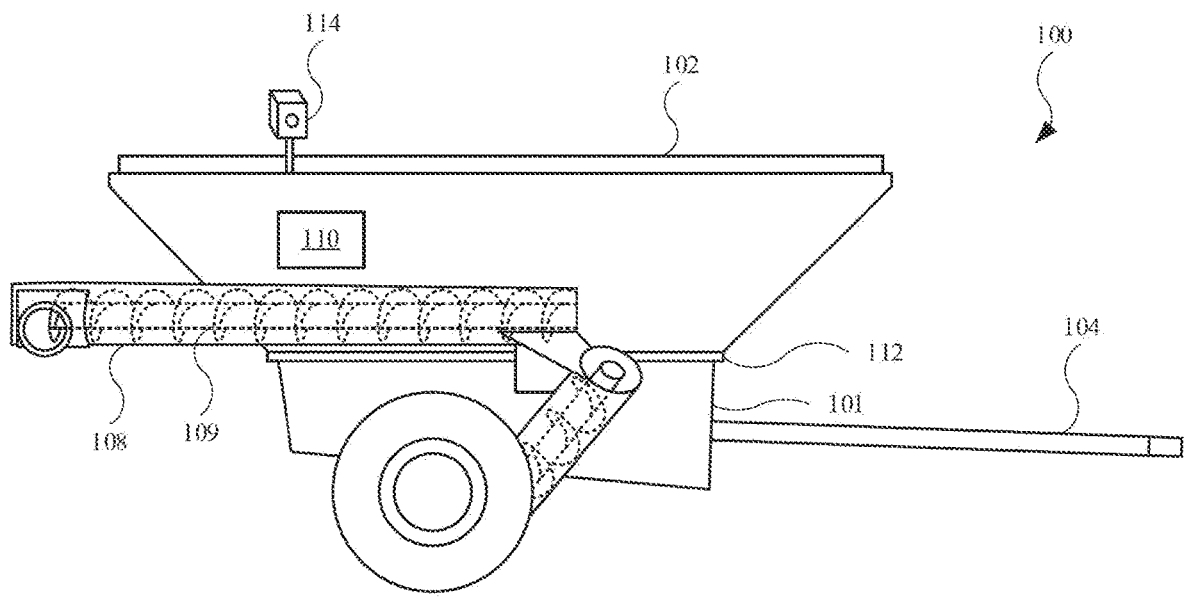
FIGS. 1A and 1B show an embodiment of a grain cart.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

In relation to electrical devices (whether stand alone or as part of an integrated circuit), the terms "input" and "output" refer to electrical connections to the electrical devices, and shall not be read as verbs requiring action. For example, a differential amplifier (such as an operational amplifier) may have a first differential input and a second differential input, and these "inputs" define electrical connections to the operational amplifier, and shall not be read to require inputting signals to the operational amplifier.

"Assert" shall mean changing the state of a Boolean signal. Boolean signals may be asserted high or with a higher voltage, and Boolean signals may be asserted low or with a lower voltage, at the discretion of the circuit designer. Similarly, "de-assert" shall mean changing the state of the Boolean signal to a voltage level opposite the asserted state.

"Controller" shall mean, alone or in combination, individual circuit components, an application specific integrated circuit (ASIC), a microcontroller with controlling software, a reduced-instruction-set computing (RISC), a digital signal processor (DSP), process with controlling software, a processor with controlling software, a programmable logic device (PLD), or a field programmable gate array (FPGA), configured to read inputs and drive outputs responsive to the inputs.

"Short-range wireless communication protocol" shall mean a wireless communication protocol in which two device directly communicate with each other wirelessly over a distance of 500 meters or less. For example, Wi-Fi, Bluetooth, Zigbee, Z-Wave, as well as certain radio frequency identification (RFID) tags and associated readers. Data communications over a cellular network shall not be considered a short-range wireless communication protocol.

"Short-range data communication module" shall mean electronic hardware devices designed and constructed to communicate using the short-range wireless data communication protocol.

"Satellite data communication protocol" shall mean a wireless communication protocol in which a land-based device directly communicates with a satellite orbiting the Earth, and the satellite relays the data to and from a remote location.

"Satellite data communication module" shall mean electronic hardware devices designed and constructed to communicate using the satellite data communication protocol.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

This application is directed to a grain cart with a theft detection system designed to prevent unwanted grain theft during a harvesting operation. As grain is harvested and transported between different machinery, each transportation event is susceptible to grain being stolen by any number of persons. To prevent this, the theft detection system includes hardware and communication components mounted to the grain cart. When mounted to a grain cart, the theft detection system may include a sensing device designed to determine a weight value, or amount, of grain during an onboarding event (i.e., when the grain cart receives grain from a harvesting machine) and send the weight value information to a remote tracking system, where the weight value information can be stored or analyzed. Additionally, the theft detection system can use the sensing device to determine a weight value of grain in the grain cart during an offloading event (i.e., when the grain cart transfers grain to a trailer) and send the weight value information to the remote tracking system.

In some examples, the grain cart includes a camera system used to identify respective indicia, or markings, on both the harvesting machine and the trailer. In this manner, the theft detection system not only tracks the amount of grain during onboarding and offloading events, but also tracks the identity of the machinery used during the onboarding and offloading events. The theft detection system can send the identification information along with the weight value information to the remote tracking system, thereby allowing the remote tracking system to store weight value and the particular machine associated with the stored weight values.

It may be desirable limit or prevent persons from learning the weight values and associated machine identities, thus reducing the likelihood of those persons exploiting this information to steal the grain. In this regard, in some exemplary embodiments, the theft detection system includes an encryption module that encrypts the information or data associated with the weight value and machine identity prior to sending the information to the remote tracking system. As a result, the machine operators or any other unknown persons cannot access, without the proper key, the weight value and machine identity information of grain collected and transported during the harvesting operation.

Additionally, the communication systems described herein may include wireless communication. Moreover, some communications system include satellite data communication (e.g., Global Position System, or GPS, and Iridium Satellite Communications system). By providing satellite communication via a satellite data communication module, the theft detection system offers several advantages over cellular network communication. For example, the satellite communication is virtually available worldwide, whereas cellular networks are available in some regions but not others. Moreover, in regions where cellular network communication is available, the cellular network communication tends to be good in some locations but poor in other locations. Also, satellite data communication is particularly advantageous in rural areas commonly associated with farmland, as farmland tends to be relatively further from cellular network base stations as compared urban areas and other high-density population areas. Accordingly, users of the theft detection system described herein do not need to rely on less reliable communication protocols, such as cellular network communication.

This detailed description refers to harvesting operations for grain, and accordingly, grain may come from various planted crops such as wheat, oats, rice, corn, sorghum, millet, rye, and barley, as non-limiting examples. However it should be noted in some examples, other harvestable crops may substitute for grain. As a result, this theft detection system may additionally apply to other harvested crops not specially discussed in this detailed description.

Figure 1B:
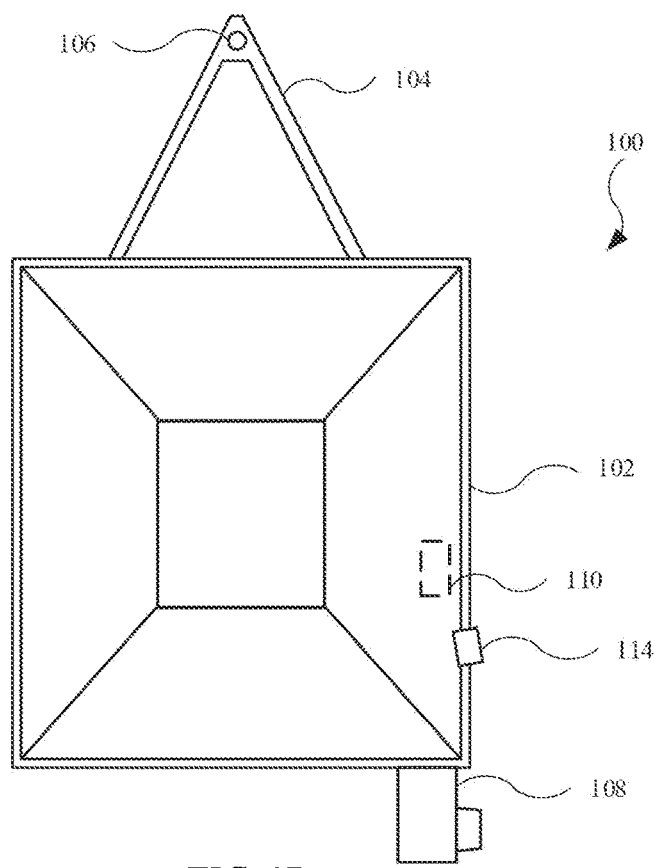

FIGS. 1A and 1B show an embodiment of a grain cart 100. The grain cart 100 is used to transport and temporarily store grain during a harvesting operation. As shown, the grain cart 100 includes a frame 101 and a grain bin 102 positioned on the frame 101. The grain bin 102 defines a volume for storing the grain. The grain cart 100 further includes a tongue or post 104 and a coupling unit 106 (located on the post 104) used to attach to a motorized vehicle (not shown in FIGS. 1A and 1B) that pulls the grain cart 100. Subsequent to receiving grain in the grain bin 102, the grain cart 100 is designed to offload the grain onto, for example, a trailer (shown later). In this regard, the grain cart 100 includes a tube 108 and an auger 109 (shown as dotted lines). While the tube 108 and the auger 109 are shown in a stored position, the tube 108 and the auger 109 can transition to a deployed position to offload grain from the grain bin 102 to the trailer. Although not shown, the grain cart 100 includes a motor used to rotationally drive the auger 109, such as a hydraulic motor driven by hydraulic fluid provided from the motorized vehicle.

In order to monitor grain, the grain cart 100 includes a theft detection system 110. The theft detection system 110 is designed to track grain, including the weight value or amount, onboarded into the grain bin 102. The "weight value" may refer to a numerical value associated with the weight measured in pounds or kilograms, as examples. Additionally, the theft detection system 110 can track grain, including the weight value offloaded from the grain bin 102 via the tube 108 and the auger 109. While the theft detection system 110 is shown as mounted to a particular location of the grain bin 102, the theft detection system 110 can be mounted to other locations of the grain bin 102 and the grain cart 100.

To determine the weight value, the theft detection system 110 may include a sensing device 112 in operational relationship with the grain bin 102. As shown in FIG. 1A, the grain gin 102 is positioned on the sensing device 112. When grain is disposed in the grain bin 102, the sensing device 112 can determine a weight value the grain bin 102 and the grain bin 102. By subtracting a known weight value of the grain bin 102, the sensing device 112 can determine the weight value of the grain when the grain is loaded into the grain bin 102. As shown in FIG. 1B, the sensing device 112 is located in the grain bin 102. In some embodiments, the sensing device 112 includes a weight management system, such as a scale. However, the sensing device 112 may take other forms, which will be shown and described below.

The theft detection system 110 may include several communication modules used to receive and transmit information. For example, the theft detection system 110 may include a satellite data communication module used to transmit information or data associated with the weight value (provided by the sensing device 112) to a tracking system remotely located with respect to the grain cart 100. Additionally, the theft detection system 110 may include a short-range wireless communication module used to send information to, and/or receive information from, other machinery (shown and discussed below) used in the harvesting operation.

In some embodiments, the grain cart 100 includes a camera system 114 used to read identifying indicia from machinery used in the harvesting operation. Each indicia on the machinery can be specific to that particular machinery. Accordingly, the theft detection system 110 can determine which machines provide grain to the grain bin 102, and which machines receive grain from the grain bin 102. In addition to the weight value, the identified indicia can also be transmitted to the tracking system using the satellite data communication module. Also, prior to transmitting to the tracking system, the theft detection system 110 may include an encryption module used to encrypt the information or data related to the weight value and the identified indicia. These features will be shown and described in further detail below.

Figure 2:
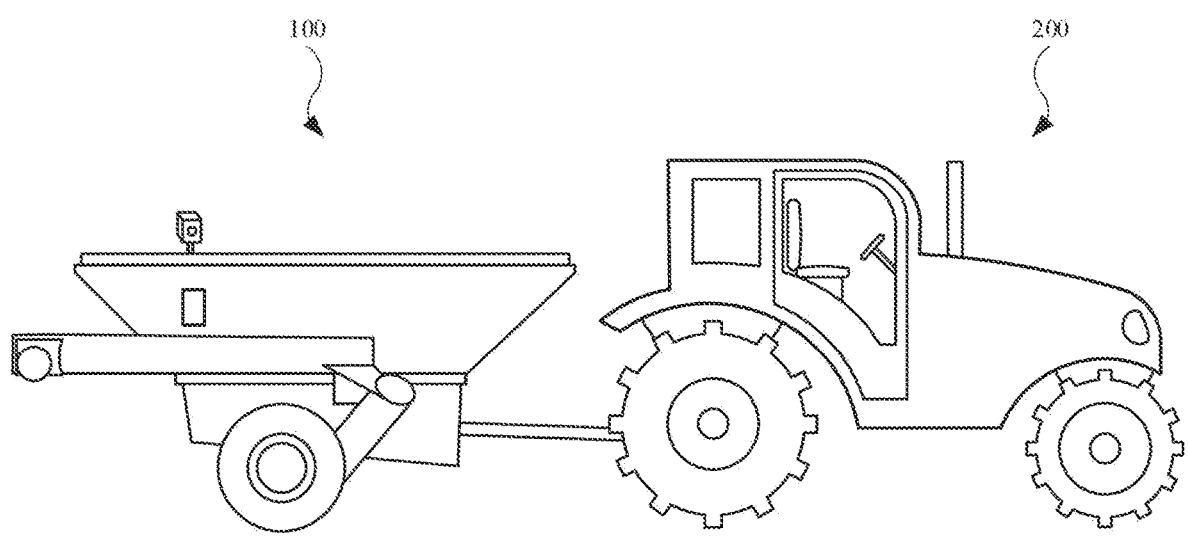
FIG. 2 shows an embodiment of a tractor used to haul the grain cart.

FIG. 2 shows an embodiment of a tractor 200 used to haul the grain cart 100. When connected to the grain cart 100, the tractor 200 can pull the grain cart 100 alongside a harvesting machine (not shown in FIG. 2). The tractor 200 is an exemplary machine, and other motorized vehicles can be used to haul the grain cart 100.

Figure 3A:
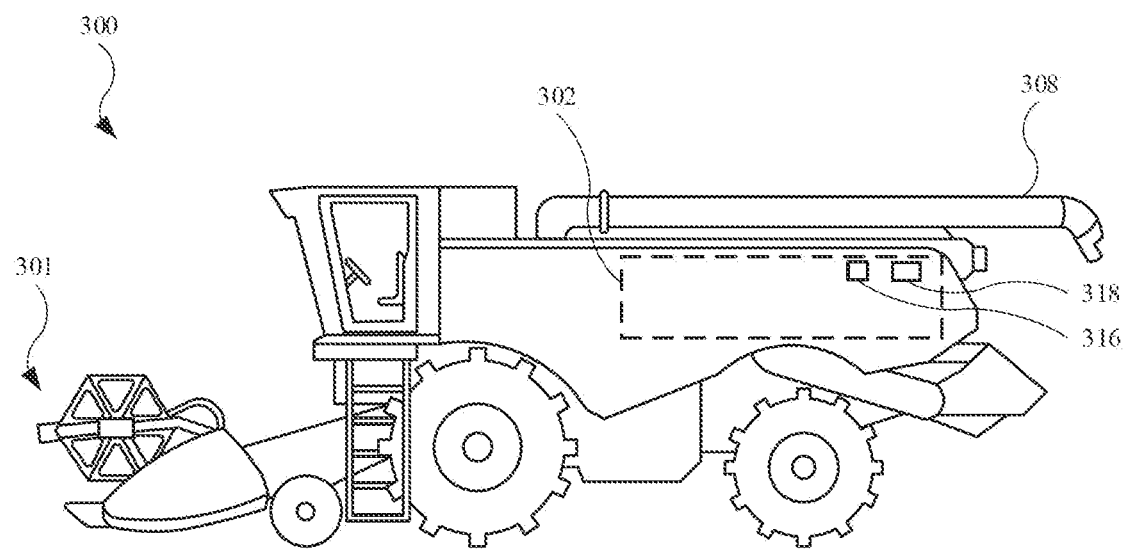
FIGS. 3A and 3B show an embodiment of a harvesting machine.
Figure 3B:
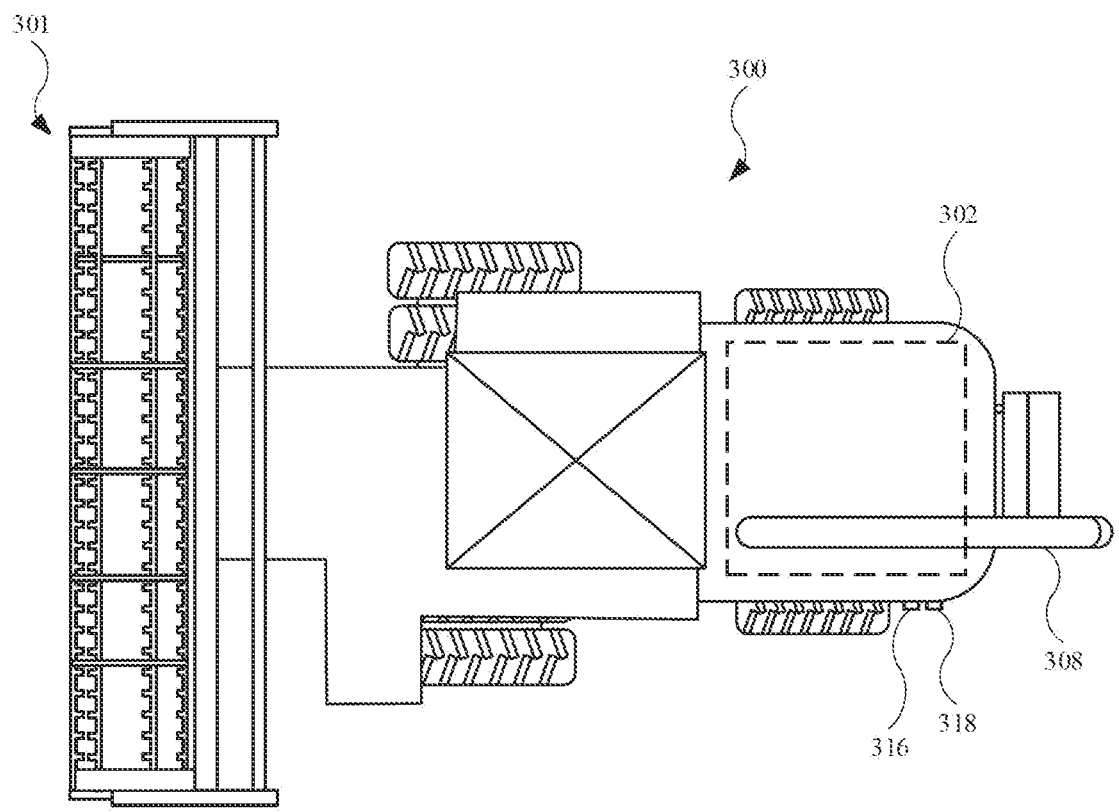

FIGS. 3A and 3B show an embodiment of a harvesting machine 300. The harvesting machine 300 can be referred to as a combine. The harvesting machine 300 is designed to retrieve, cut, and sort grain from the harvested crop. As shown, the harvesting machine 300 includes a head 301 having various parts (not labeled), such as a reel and a cutter bar. The head 301 may include a detachable head. In this manner, the head 301 can be substituted with one or more different heads having different sizes and different components based on the type of grain. The harvesting machine 300 further includes a grain bin 302 used as a volume to store grain. Although not shown, the harvesting machine 300 may include a conveyor belt used to transport the grain from the head 301 to the grain bin 302. In order to remove the grain from the grain bin 302, the harvesting machine includes a tube 308 and an auger (not shown in FIGS. 3A and 3B) used to extract the grain from the grain bin 302 to, for example, a grain bin (e.g., grain bin 102 shown in FIG. 1A). Additionally, in some embodiments, the harvesting machine 300 includes an indicium 316 used to identify the harvesting machine 300. In this regard, the indicium 316 may be unique to the harvesting machine 300 such that the harvesting machine 300 can be distinguished from other harvesting machines. Referring to the grain cart 100 in FIGS. 1A and 1B, the camera system 114 can read an indicium (such as the indicium 316) and provide, to the theft detection system 110, information related to the indicium. Additionally, in some embodiments, the harvesting machine 300 includes a communication module 318 used to receive and/or transmit short-range wireless communication. Referring again to the grain cart 100 in FIGS. 1A and 1B, the theft detection system 110, also having communication capabilities, can retrieve information from the communication module 318, such as a weight value of grain in the grain bin 302 (as determined by the harvesting machine 300 prior to an onboarding event), authentication information used to verify the harvesting machine 300 (including an expected harvesting machine during a harvesting operation), a time stamp associated with initiation of onboarding event, and/or a time duration associated with the time taken for the onboarding event.

Figure 4:
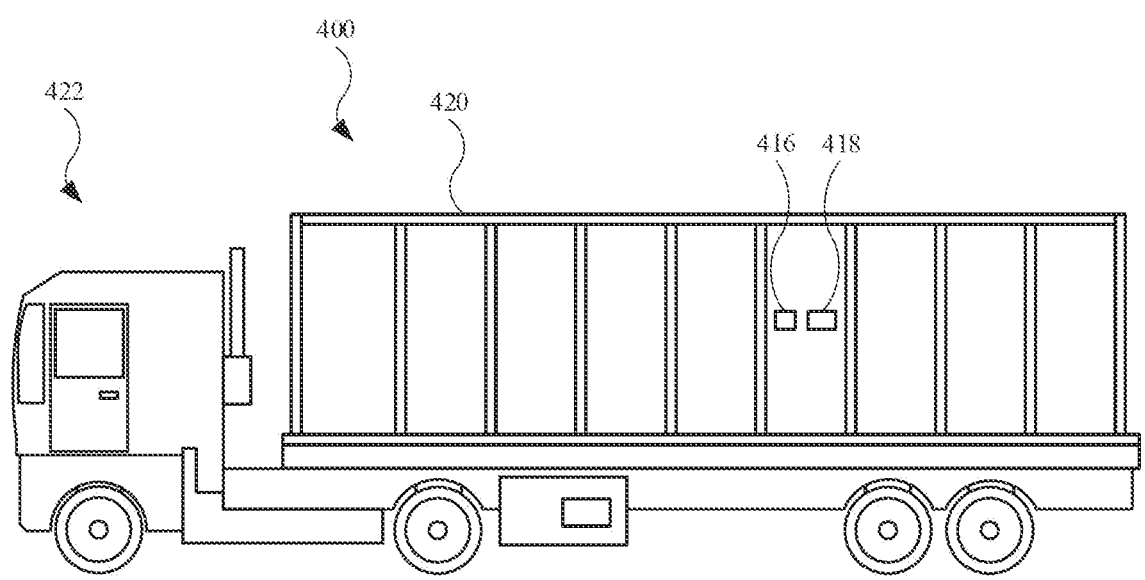
FIG. 4 shows an embodiment of a trailer.

FIG. 4 shows an embodiment of a trailer 400. The trailer 400 can be used as an offload container for offloading grain from a grain cart. As shown, the trailer 400 includes a container 420 used as a volume to store the grain. Also, the trailer 400 is connected to a semi-truck 422 used to haul the trailer 400. In an example harvesting operation, the trailer 400 cam remain stationary until a grain cart and tractor (not shown in FIG. 4) arrive alongside the trailer 400. Subsequent to an offloading event of grain into the trailer 400, the semi-truck 422 can haul the trailer 400 (filled with grain) to a storage facility. The semi-truck 422 is an exemplary machine, and other motorized vehicles can be used to haul the trailer 400.

In some embodiments, the trailer 400 includes an indicium 416 used to identify the trailer 400. In this regard, the indicium 416 may be unique to the trailer 400 such that the trailer 400 can be distinguished from other trailers. Referring to the grain cart 100 in FIGS. 1A and 1B, the camera system 114 can read an indicium (such as the indicium 416) and provide, to the theft detection system 110, information related to the indicium. Additionally, in some embodiments, the trailer 400 includes a communication module 418 used to receive and/or transmit short-range wireless communication. Referring again to the grain cart 100 in FIGS. 1A and 1B, the theft detection system 110, also having communication capabilities, can retrieve information from the communication module 418, such as a weight value of grain in the container 420 subsequent to an offloading event, authentication information used to verify the trailer 400, a time stamp associated with offloading event, and/or a time duration associated with offloading event.

Figure 5:
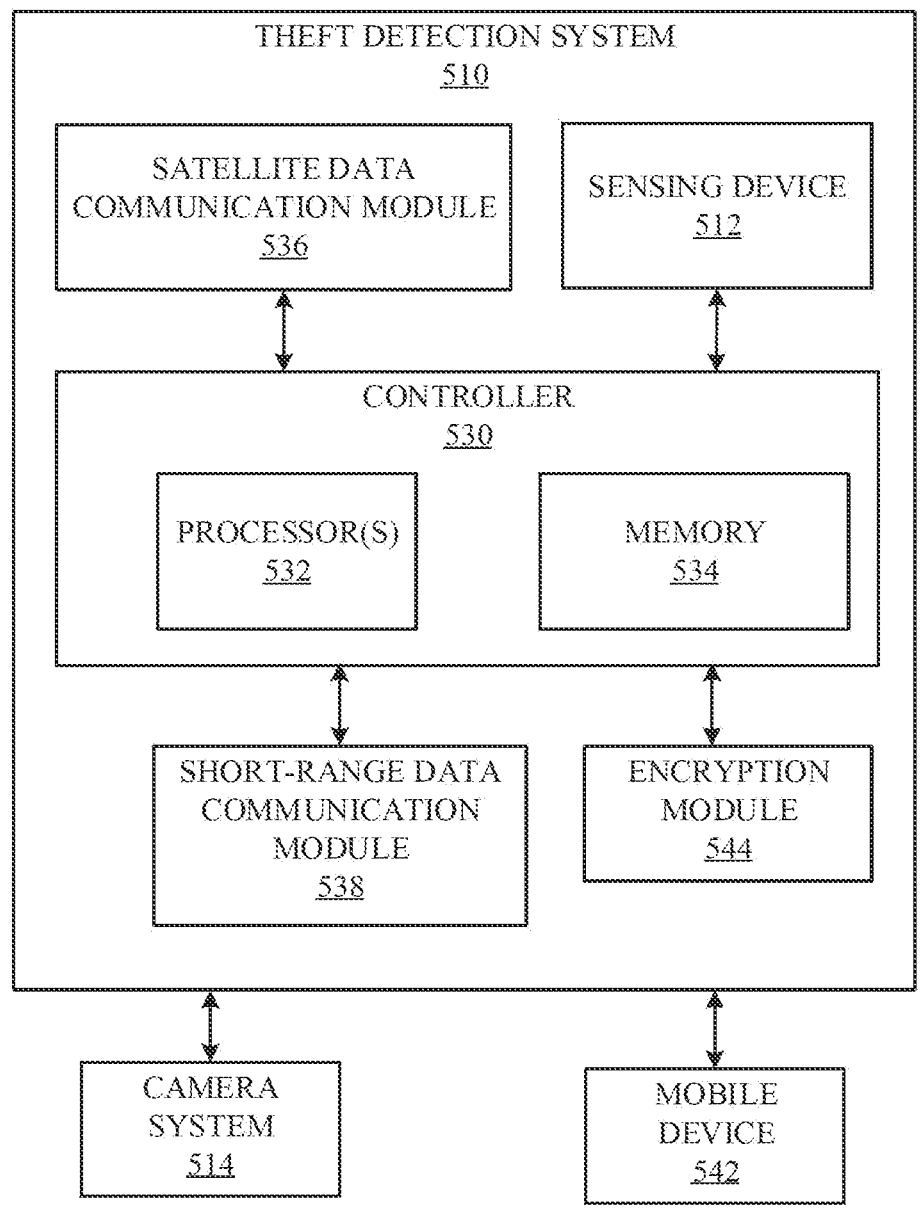
FIG. 5 shows a schematic diagram of a theft detection system, in accordance with some described embodiments.

FIG. 5 shows a schematic diagram of a theft detection system 510, in accordance with some described embodiments. Other theft detection systems (e.g., the theft detection system 110, shown in FIGS. 1A and 1B) may include any features described herein for the theft detection system 510. The theft detection system 510 can be mounted to farm equipment, such as grain carts (e.g., the grain cart 100) described herein.

The theft detection system 510 may include a controller 530 used to receive communication from input devices and use the communication to output controls or commands to other devices. The controller 530 may include a programmable logic controller or one or more microcontrollers, as non-limiting examples. The controller 530 may include one or more processors 532 and memory 534. When the controller 530 is implemented as a processor 532 and memory 534, the one or more processors 532 are designed to execute instructions or algorithms stored on the memory 534, which may include random access memory or read-only memory.

The theft detection system 510 may further include a sensing device 512 operatively coupled to the controller 530. The sensing device 512 is designed to determine a weight value (i.e., amount of grain) in a grain bin of the grain cart. In this regard, the sensing device 512 can determine a weight value of the grain during an onboarding event, and provide the weight value information to the controller 530. Accordingly, based on the determined weight value by the sensing device 512, the theft detection system 510 can determine the weight value of the grain to be provided from the grain cart to the trailer during an offloading event. Several exemplary embodiments of the sensing device are shown and described below.

The theft detection system 510 may further include a satellite data communication module 536 operatively coupled to the controller 530. The satellite data communication module 536 may rely upon satellite data communication protocol, such as the Iridium Satellite Communications system, to transmit information. When directed by the controller 530, the satellite data communication module 536 is designed to transmit information to a tracking system (e.g., a server, including cloud-based server, a database, or a computing system). The satellite data communication module 536 can provide the weight value information of grain, as determined by the sensing device 512, to the tracking system. Additionally, the satellite data communication module 536 can also provide indicia information of machinery (e.g., harvesting machine and/or trailer), as determined by a camera system 514 communicatively coupled to the controller 530.

The theft detection system 510 may further include a short-range data communication module 538. The short-range data communication module 538 communicates over short-range communication protocols, such as BLUETOOTH® or WIFI®, as non-limiting examples. The short-range data communication module 538 is designed to communicate with communication modules (e.g., communication module 318 of the harvesting machine 300 in FIGS. 3A and 3B, and communication module 418 of the trailer 400 in FIG. 4). As non-limiting examples, the received communication may include identifying indicia of the harvesting machine, a weight value of grain in a grain bin of a harvesting machine prior to an onboarding event, identifying indicia of a trailer, a weight value of grain in grain bin of a trailer subsequent to an offloading event, a time stamp associated with initiation of the onboarding or offboarding events, and/or a time duration associated with the onboarding or offboarding events.

Alternatively, or in combination, the short-range data communication module 538 can determine identifying information of the harvesting machine and/or the trailer by communicating with mobile devices, including mobile wireless communication devices (e.g., smartphones) that also include short-range wireless communication modules operating over short-range communication protocols. For example, when an operator (i.e., driver) of a harvesting machine carries a mobile device 542, the mobile device 542 can store identification information that is unique to the harvesting machine. The theft detection system 510 can use the short-range data communication module 538 to communicate with the mobile device 542 and receive the unique identification information. While an example for an operator of a harvesting machine is given, an operator of a semi-truck hauling the trailer may also carry a mobile device similar to the mobile device 542, and accordingly, the short-range data communication module 538 can receive identification information from the operator of the semi-truck hauling the trailer that is unique to the trailer.

In order to prevent persons (including vehicle operators of the harvesting machines, farmhand/laborers, and/or the nefarious actors) from gaining knowledge of the weight values of the grain, the theft detection system 510 may further include an encryption module 544 operatively coupled to the controller 530. Prior to the satellite data communication module 536 providing information to the tracking system, the encryption module 544 can use an encryption algorithm (e.g., private key or public key encryption) to encrypt the information. In either encryption algorithm, the key is shared with the tracking system, and if desired, shared with only trusted personnel.

The theft detection system 510 can use the received information to monitor and detect grain theft in a number of ways. For example, prior to an onboarding event, the theft detection system 510 receives a weight value of grain, using the short-range data communication module 538, from a communication module of a harvesting machine. Additionally, the theft detection system 510 receives a weight value, using the sensing device 512, onboarded onto the grain cart. processor 532 can execute instructions stored on the memory 534 to compare and determine the difference between the weight values. If the difference between the weight values is greater than a predetermined threshold, then the controller 530 can generate and transmit a notification, using the satellite data communication module 536, to a tracking system. For example, a notification may include an alarm or alert indicating an unexpected difference (i.e., exceeded predetermined threshold) in grain has been detected, which may correspond to grain theft. Accordingly, the notification may indicate that grain was stolen during the onboarding event.

In another example, the theft detection system 510 receives a weight value of grain, using the sensing device 512, disposed in the grain cart. Subsequent to an offloading event, the theft detection system 510 can obtain a weight value of grain, using the short-range data communication module 538, from a communication module of a trailer. The processor 532 can again execute instructions stored on the memory 534 to compare and determine the difference between the weight values, and if the difference between the weight values is greater than a predetermined threshold, then the controller 530 can generate and transmit a notification, using the satellite data communication module 536, to the tracking system, indicating that grain was stolen during the offloading event.

Further, in some embodiments, the theft detection system 510 uses the short-range data communication module 538 to receive respective weight values of grain provided by the harvesting machine and by the trailer, and determines the difference between the weight values. If the difference between the weight values is greater than a predetermined threshold, then the controller 530 can generate and transmit a notification, using the satellite data communication module 536, to the tracking system. The notification may indicate that grain was stolen during one or more of the onboarding or offloading events, or was stolen while the grain was disposed in the grain cart (independently of the onboarding or offloading events). Accordingly, the theft detection system 510 is designed to monitor and compare the weight values at the multiple, different stages.

In some embodiments, the "predetermined threshold" is based on a predetermined weight difference, such as a value between 50 to 100 pounds (or 22.7 to 45.4 kilograms, respectively). In this regard, the notification is generated and transmitted when the weight difference between two weight values is greater than the predetermined weight difference (i.e., greater than 50 to 100 pounds). Alternatively, in some embodiments, the "predetermined threshold" is based on a percent difference. For example, an initial weight value (e.g., in the harvesting machine prior to the onboarding event, or in the grain cart prior to the offloading event) may be defined as "100%" of the grain, and when a subsequent weight value is (e.g., after the onboarding event into the grain cart, or after the offloading event into the trailer) is a percentage below a predetermined threshold percentage (e.g., 5% to 10% below), then the controller 530 can generate and transmit the notification to the tracking system.

Further, in some embodiments, the theft detection system 510 uses the sensing device 512 to continually monitor a cumulative weight value of grain in a grain bin. As a result, the theft detection system 510 can determine in real-time a weight value of grain in the grain bin during onboarding and offloading events, which can be advantageously used in several ways. For example, during an offloading event, the theft detection system 510 can continually monitor a cumulative weight value of grain in a grain bin, and when the theft detection system 510 does not receive a trailer identity from a trailer onto which the grain is to be offloaded, the theft detection system 510 can transmit a notification to the tracking system. The notification may indicate the grain is being offloaded to an unauthorized trailer or other unauthorized container. Also, the theft detection system 510 can continually monitor a cumulative weight value of grain in a grain bin, and in the absence of any type of onboarding or offloading event, if the cumulative weight of grain in the grain bin decreases, then the theft detection system 510 can transmit a notification to the tracking system. The notification may indicate the grain is being taken from the grain cart without authorization.

In some embodiments, the theft detection system 510 uses the short-range data communication module 538 to receive an expected weight value of grain and then compares the expected weight value with an actual weight value determined by the sensing device 512. For example, prior to an onboarding event, the theft detection system 510 can receive an expected weight value from a harvesting machine indicating a weight value of grain to be onboarded to a grain cart. Then, subsequent to the onboarding event, the theft detection system 510 can determine the actual weight value of grain received from the harvesting machine. The theft detection system 510 can then compare the expected and actual weight values, and provide a notification to the tracking system when the difference between the expected and actual weight values is greater than a predetermined threshold. Similarly, prior to an offloading event, the theft detection system 510 can determine an initial weight value of grain in the grain bin that is to be offloaded to the trailer. Then, subsequent to the offloading event, the theft detection system 510 can receive a final weight value from the trailer indicating a weight value of grain that was offloaded from the grain cart to the trailer. The theft detection system 510 can then compare the initial and final weight values, and provide a notification to the tracking system when the difference the initial and final weight values is greater than a predetermined threshold.

As described, the theft detection system 510 can be used to determine potential grain theft events and generate notifications to the tracking system. However, in some embodiments, the theft detection system 510 is designed to track/record various weight values, track/record various harvester and trailer identifies, and transmit this information to the tracking system, thereby allowing the tracking system to determine grain theft events. In other words, the theft detection system 510 can be used without determining potential grain theft events and without generating notifications, and can simply provide information to the tracking system.

Figure 6A:
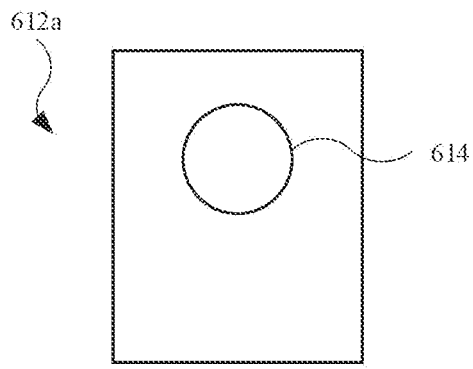
FIGS. 6A-6C show various embodiments of a sensing device.
Figure 6B:
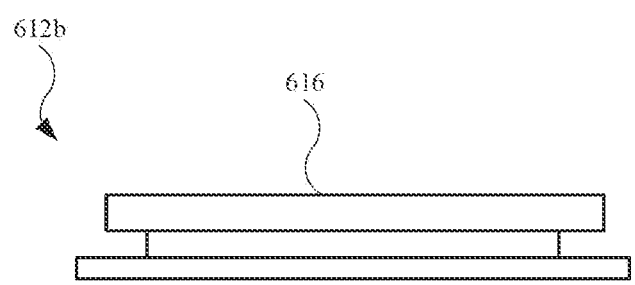
Figure 6C:
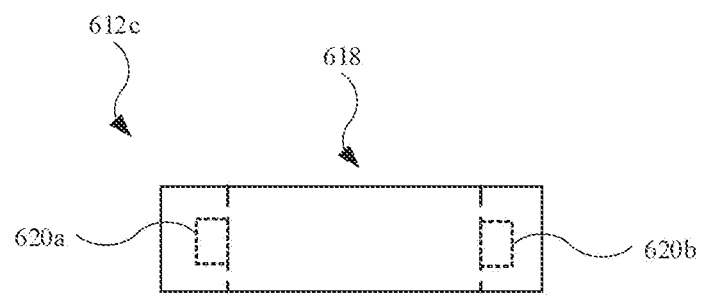

FIGS. 6A-6C show various embodiments of a sensing device. The sensing devices shown and described in FIGS. 6A-6C are exemplary sensing devices that may be placed on grain cart, and communicatively coupled to a theft detection system described herein. FIG. 6A shows a sensing device 612*a* in the form of an image sensing device. In this manner, the sensing device 612*a* includes an image detector 614 used to monitor a grain bin, and determine an image of the grain in the grain bin. In some embodiments, the image is converted into a three-dimensional image. Using volume information of the grain bin, the sensing device 612*a* can determine a weight value of the grain.

FIG. 6B shows a sensing device 612*b* in the form of a weight management system. In this manner, the sensing device 612*b* may include a weight sensor or scale used to measure force applied to a platform 616, and convert the measured force into a weight value. In order to measure the force, the sensing device 612*b* may use features such as a strain gauge, a piezoelectric sensor, or other pressure-sensitive component, as non-limiting examples.

FIG. 6C shows a sensing device 612*c* in the form of a flow rate sensor. The sensing device 612*c* may include an opening 618 through which grain passes. The sensing device 612*c* may further include a transmitter 620*a* that transmits light and a receiver 620*b* used to at least partially receive light from the transmitter 620*a*. As grain passes through the opening, the grain partially blocks the light from the transmitter 620*a*, and sensing device 612*c* can determine a flow based upon the amount of light received by the receiver 620*b*. The flow rate is inversely proportional to light received at the receiver 620*b*, and accordingly, the flow rate is greater for less light received. The sensing device 612*c* can determine the weight value based upon the flow rate and additional information, such as density and moisture content.

Figure 7A:
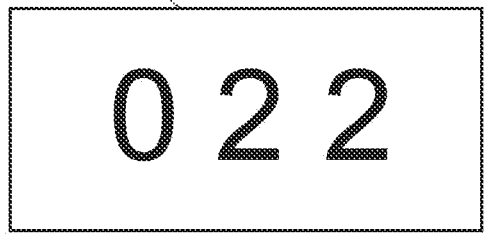
FIGS. 7A-7E show various embodiments of an indicia used to identify machinery.
Figure 7B:
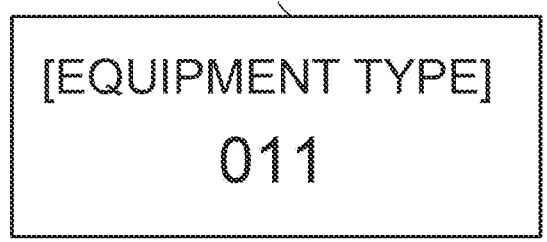
Figure 7C:
Figure 7D:
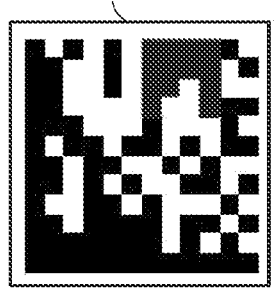
Figure 7E:
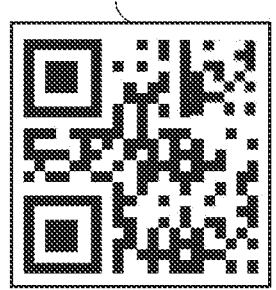

FIGS. 7A-7E show various embodiments of indicia used to identify machinery. The indicia shown and described in FIGS. 7A-7E are exemplary indicia that may be placed on a harvesting machine and/or a trailer in a location visible and readable by a camera system communicatively coupled to a theft detection system described herein. FIG. 7A shows an indicium 716*a* in the form of a number. The number may be unique to a harvesting machine and/or to a trailer. FIG. 7B shows an indicium 716*b* in the form of alphanumeric elements. As shown, the indicium 716*b* may include both letters (forming a word) and numbers used uniquely identify a harvesting machine and/or to a trailer. In some embodiments, the number is removed and the indicium 716*b* in word form only. FIG. 7C shows an indicium 716*c* in the form of a one-dimensional bar code. The indicium 716*c* represents a Universal Product Code ("UPC"). However, it should be noted that several other one-dimensional product codes are possible. FIG. 7D shows an indicium 716*d* in the form of a two-dimensional bar code. As shown, the indicium 716*d* includes a data matrix code. FIG. 7E shows an alternate embodiment of an indicium 716*e* in the form of a two-dimensional bar code. As shown, the indicium 716*e* includes a quick response ("QR") code. It should be noted that several other two-dimensional product codes are possible.

Figure 8:
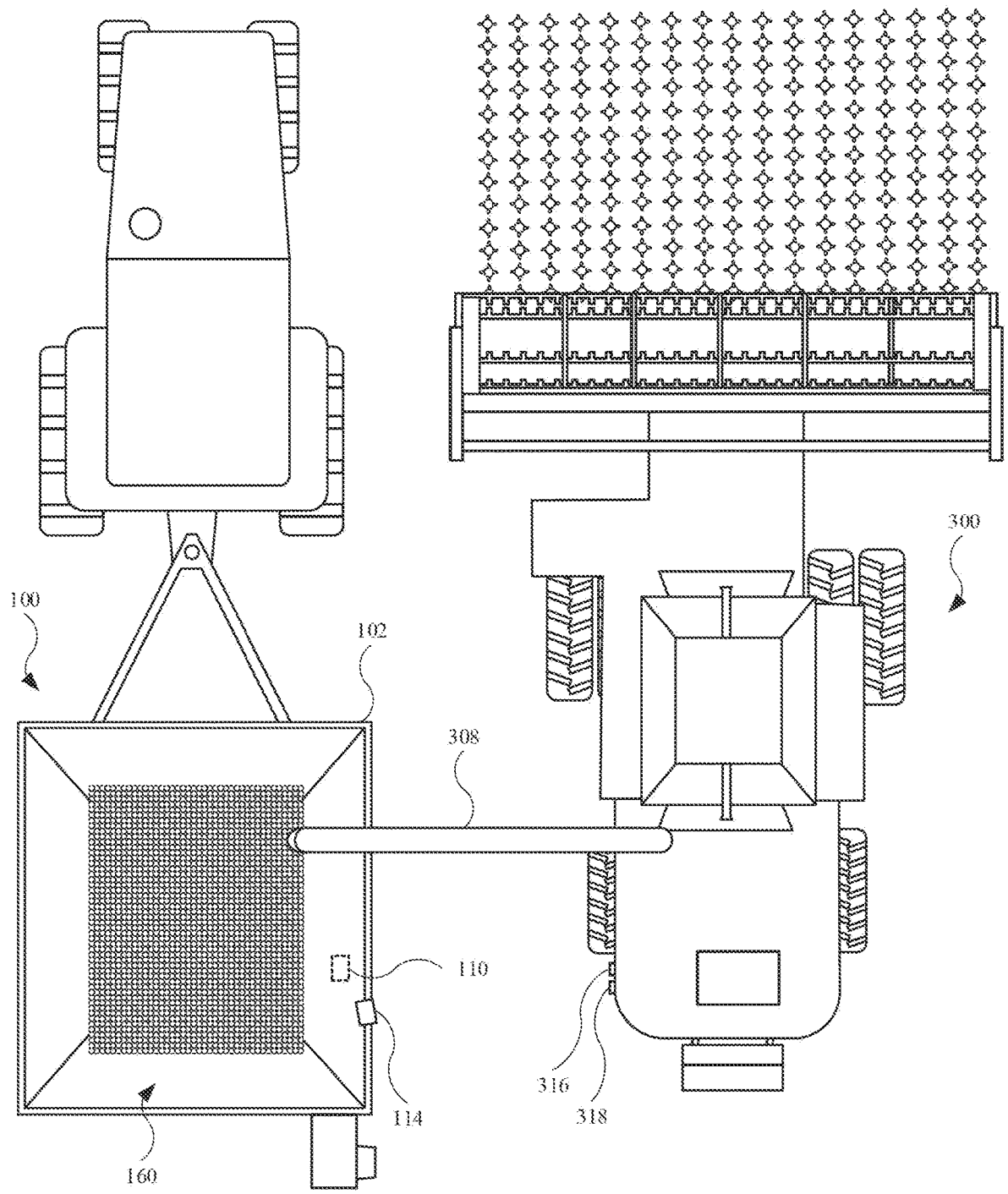
FIG. 8 shows an aerial view of a harvesting machine unloading grain onto a grain cart, in accordance with some described embodiments.

FIG. 8 shows an aerial view of a harvesting machine 300 unloading grain 160 onto a grain cart 100, in accordance with some described embodiments. As shown, the tube 308 of the harvesting machine 300 is extended/deployed and positioned over the grain bin 102, and grain 160 is being onboarded to the grain bin 102 from the harvesting machine 300. The theft detection system 110 can use the sensing device (e.g., sensing device 112 shown in FIG. 1A) to determine a weight value of the grain 160 in the grain bin 102. Additionally, based on the relationship between the grain cart 100 and the harvesting machine 300, the camera system 114 is able to read the indicium 316 located on the harvesting machine 300, and a short-range wireless communication module (e.g., short-range data communication module 538 shown in FIG. 5) is within range to communicate with the communication module 318 of the harvesting machine 300.

Figure 9:
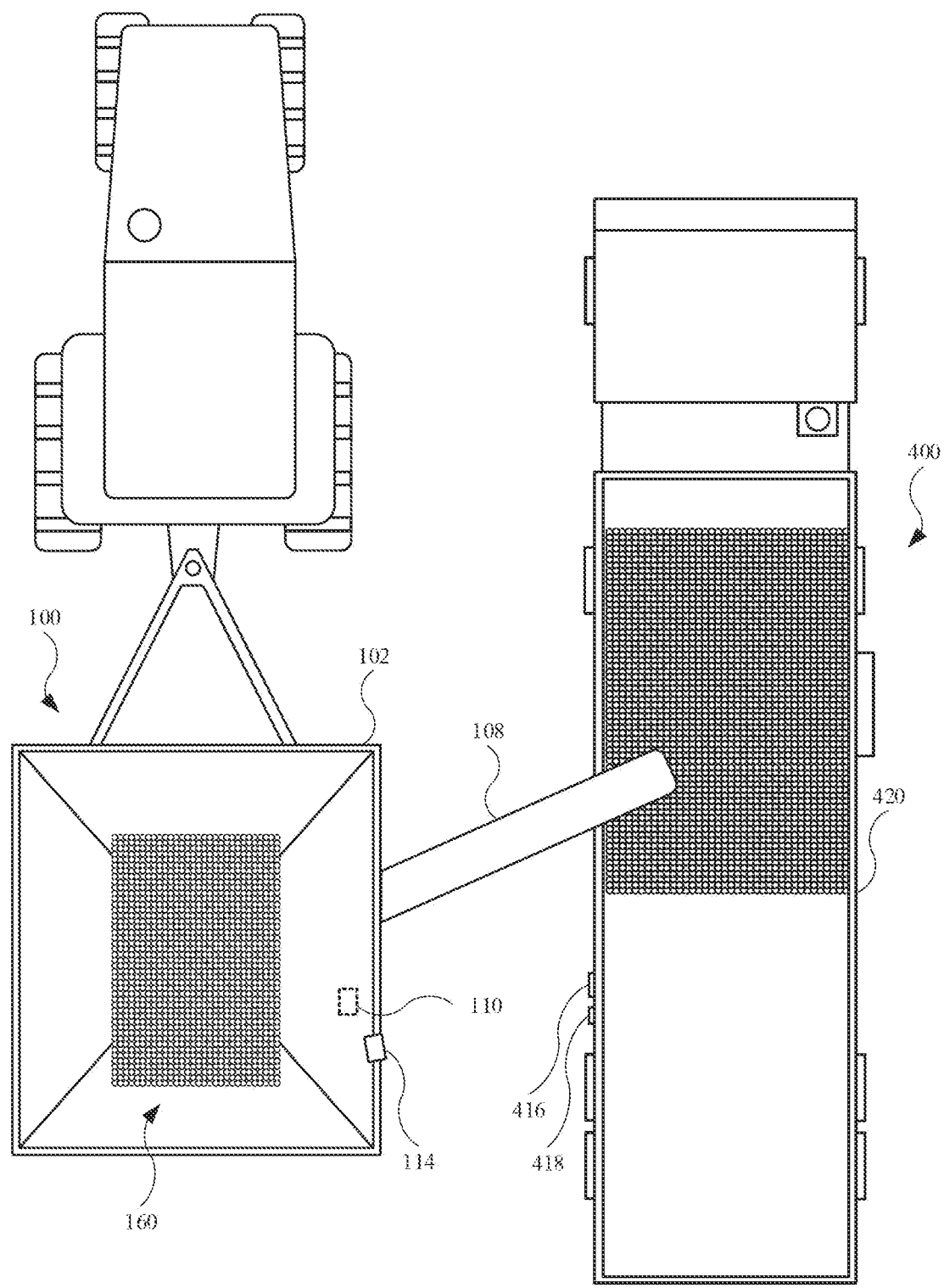
FIG. 9 shows an aerial view of a grain cart unloading grain onto a trailer, in accordance with some described embodiments.

FIG. 9 shows an aerial view of a grain cart 100 unloading grain 160 onto a trailer 400, in accordance with some described embodiments. As shown, the tube 108 of the grain cart 100 is extended/deployed and positioned over the container 420 of the trailer 400, and grain 160 is being offloaded from the grain bin 102 to the container 420. The theft detection system 110 can use the sensing device (e.g., sensing device 112 shown in FIG. 1A) to determine a weight value of the grain 160, including continuously monitoring the weight value during the offloading event. Additionally, based on the relationship between the grain cart 100 and the trailer 400, the camera system 114 is able to read the indicium 416 located on the trailer 400, and a short-range wireless communication module (e.g., short-range data communication module 538 shown in FIG. 5) is within range to communicate with the communication module 418 of the trailer 400.

Figure 10:
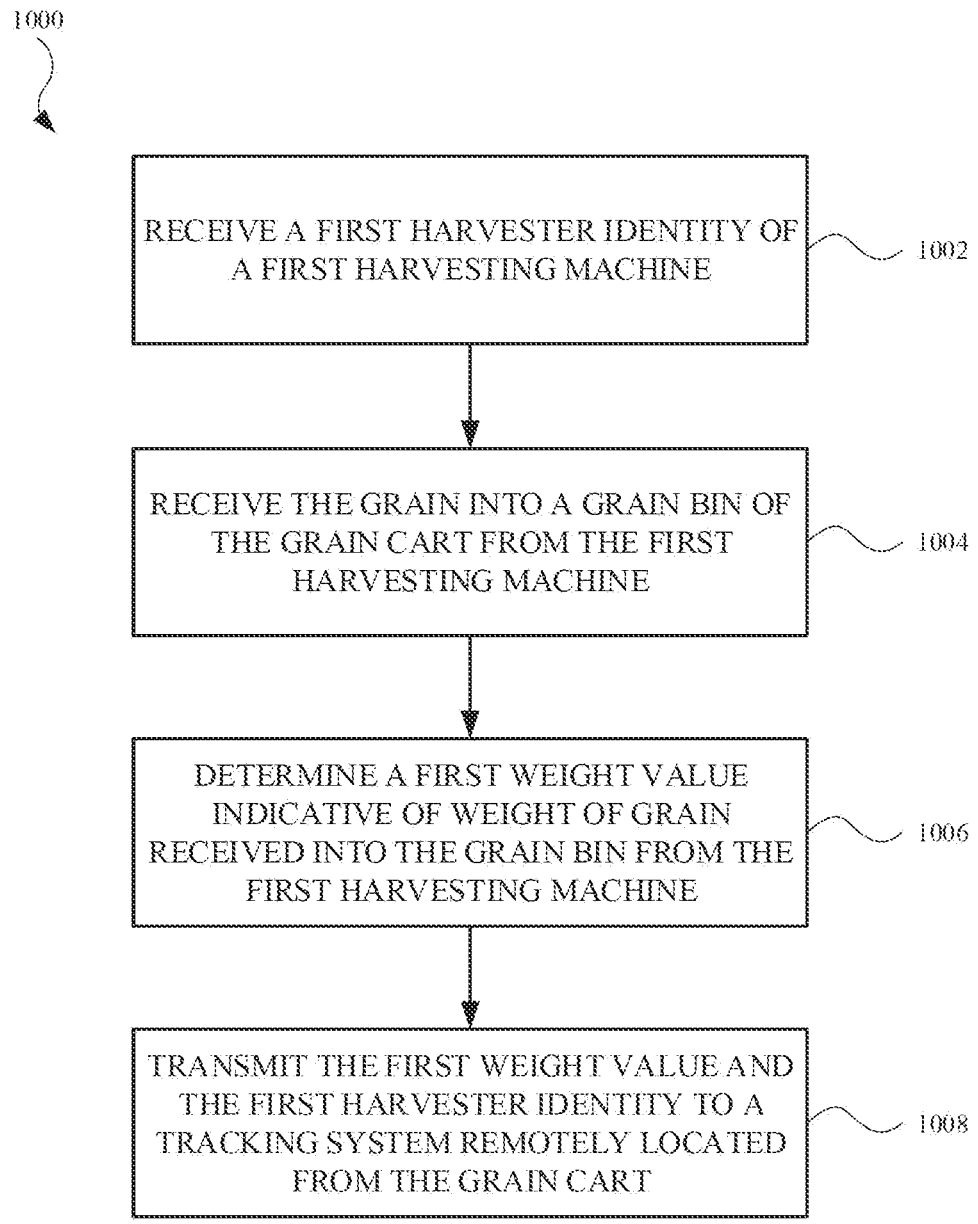
FIG. 10 shows a method for transferring grain in a harvesting operation.

FIG. 10 shows a method 1000 for transferring grain in a harvesting operation, in accordance with some described embodiments. The steps of the method 1000 can be performed by a theft detection system described herein.

In step 1002, a first harvester identity of a first harvesting machine is received. A theft detection system, disposed on a grain cart, can receive the first harvester identity. In some embodiments, the theft detection system includes a short-range wireless communication module used to communicate and received the first harvester identity from a communication module on the first harvesting machine. In some embodiments, the theft detection system uses a camera system (disposed on the grain cart) used to read indicia that identifies the first harvesting machine. As non-limiting examples, the indicia may include a number visible on the first harvesting machine, a bar code (one- or two-dimensional) disposed on the first harvesting machine, and a word visible on the first harvesting machine. Additionally, in some embodiments, the theft detection system can communicate with a mobile device of an operator of the first harvesting machine to determine the first harvester identity.

In step 1004, the grain is received into a grain bin of the grain cart from the first harvesting machine. The first harvesting machine may include a tube and auger used to remove the grain from the first harvesting machine and onboard the grain into the grain bin of the grain cart.

In step 1006, a first weight value indicative of weight of grain received into the grain bin from the first harvesting machine is determined. In order to determine the first weight value, the grain cart may include a sensing device disposed on the grain cart and communicatively coupled to the theft detection system, including a controller of the theft detection system. As non-limiting examples, the sensing device may include an image sensing device, a weight management system, or a flow rate sensor. Using the sensing device, the theft detection system can determine an amount of grain received by the first harvesting machine.

In step 1008, the first weight value and the first harvester identity are transmitted to a tracking system remotely located from the grain cart. The tracking system may take the form of any number of remote systems, such as a remote server (including a cloud-based server), a database, or a computing system. In order to transmit the first weight value and the first harvester identity, the theft detection system may include a satellite data communication module that transmits via satellite data communication protocol. Additionally, in order to prevent persons from obtaining the first weight value and the first harvester identity, the theft detection system may include an encrypted module that encrypts data related to the first weight value and the first harvester identity, thereby allowing the satellite data communication module to transmit the data at least partially in an encrypted form.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method for transferring grain in a grain cart during a harvesting operation, the method comprising:
   receiving a first harvester identity of a first harvesting machine, the receiving by a theft detection system disposed on the grain cart;
   receiving the grain into a grain bin of the grain cart from the first harvesting machine;
   determining a first weight value indicative of weight of grain received into the grain bin from the first harvesting machine, the determining by a sensing device disposed on the grain cart and communicatively coupled to the theft detection system; and
   transmitting the first weight value and the first harvester identity to a tracking system remotely located from the grain cart, the transmitting by the theft detection system using a satellite data communication protocol, and the transmitting at least partially in an encrypted form.

2. The method of claim 1, further comprising:
   continually monitoring a cumulative weight value of indicative of weight of grain in the grain bin, the monitoring by the theft detection system and the sensing device; and
   sending an alarm to the tracking system if the grain is offloaded from the grain bin in an absence of receiving an offload trailer identity.

3. The method of claim 1, wherein receiving the first harvester identity further comprises receiving the first harvester identity, the receiving by a short-range wireless communication protocol.

4. The method of claim 1, wherein receiving the first harvester identity further comprises reading identifying indicia of the first harvesting machine, the reading by a camera system coupled to the theft detection system.

5. The method of claim 4, wherein reading the identifying indicia further comprises at least one selected from a group comprising:
   reading a number visible on the first harvesting machine;
   reading a bar code disposed on the first harvesting machine;
   reading a one-dimensional bar code disposed on the first harvesting machine;
   reading a two-dimensional bar code disposed on the first harvesting machine; and reading a word visible on the first harvesting machine.

6. The method of claim 1, wherein receiving the first harvester identity further comprises receiving, by way of a short-range wireless communication protocol, the first harvester identity from a portable communication device of an operator of a tractor pulling the grain cart.

7. The method of claim 1, further comprising receiving an offload trailer identity of an offload trailer, the receiving by a short-range wireless communication protocol.

8. The method of claim 7, wherein receiving the offload trailer identity further comprises reading identifying indicia of the offload trailer, the reading by a camera system coupled to the theft detection system.

9. The method of claim 8, wherein reading the identifying indicia further comprises at least one selected from a group comprising:
   reading a number visible on the offload trailer;
   reading a bar code disposed on the offload trailer;
   reading a one-dimensional bar code disposed on the offload trailer;
   reading a two-dimensional bar code disposed on the offload trailer; and
   reading a word visible on the offload trailer.

10. The method of claim 7, wherein receiving the offload trailer identity further comprises receiving, by way of the short-range wireless communication protocol, the offload trailer identity from a portable communication device of an operator of a tractor pulling the grain cart.

11. The method of claim 7, further comprising:
   offloading the grain from the grain bin to the offload trailer;
   determining an offload weight value indicative of weight of grain offloaded from the grain bin to the offload trailer, the determining by the sensing device communicatively coupled to the theft detection system; and
   sending an alarm to the tracking system if a difference between the offload weight value and the onboarded weight value, corresponding to the first weight value, is greater than a predetermined threshold, the sending by the tracking system using the satellite data communication protocol.

12. A grain cart for transferring grain in a harvesting operation, the grain cart comprising:
   a frame;
   a grain bin mounted on the frame;
   a sensing device configured to determine a weight value indicative of weight of grain in the grain bin; and
   a theft detection system coupled to the grain bin, the theft detection system comprising:
      a satellite data communication module;
      a controller coupled to the sensing device, the controller configured to:
         receive a harvester identity of a harvesting machine;
         determine a weight value indicative of weight of grain received into the grain bin from the harvesting machine, the determination using the sensing device; and
         transmit the weight value and the harvester identity to a tracking system remotely located from the grain cart, the transmitting using the satellite data communication module, and the transmitting at least partially in an encrypted form.

13. The grain cart of claim 12, wherein the theft detection system further comprises a short-range data communication module coupled to the controller, and the controller is further configured to receive the harvester identity, the receiving by way of the short-range data communication module.

14. The grain cart of claim 12, wherein the theft detection system further comprises a camera system operatively coupled to the controller, and the controller is further configured to read identifying indicia of the harvesting machine by way of the camera system.

15. The grain cart of claim 14, wherein the controller is further configured to read the identifying indicia selected from a group comprising:
   a number visible on the harvesting machine;
   a bar code disposed on the harvesting machine;
   a one-dimensional bar code disposed on the harvesting machine;
   a two-dimensional bar code disposed on the harvesting machine; and
   a word visible on the harvesting machine.

16. The grain cart of claim 12, wherein the theft detection system further comprises a short-range wireless communication module coupled to the controller, and the controller is further configured to receive the harvester identity from a portable communication device of an operator of a tractor pulling the grain cart, the receiving by way of the short-range wireless communication protocol.

17. The grain cart of claim 12, wherein the controller is further configured to:
   receive an offload trailer identity of an offload trailer;
   determine, using the sensing device, an offload weight value indicative of weight of grain offloaded from the grain bin to the offload trailer; and
   transmit, using the satellite data communication module, the offload weight value and the offload trailer identity to the tracking system.

18. The grain cart of claim 17, wherein the theft detection system further comprises:
   a short-range data communication module coupled to the controller, and
   the controller is further configured to receive, using the short-range data communication module, the offload trailer identity.

19. The grain cart of claim 17, wherein the theft detection system further comprises a camera system operatively coupled to the controller, and the controller is configured to read identifying indicia of the offload trailer by way of the camera system.

20. The grain cart of claim 19, wherein the controller is further configured to read the identifying indicia selected from a group comprising:
   a number visible on the offload trailer;
   a bar code disposed on the offload trailer;
   a one-dimensional bar code disposed on the offload trailer;
   a two-dimensional bar code disposed on the offload trailer; and
   a word visible on the offload trailer.

21. The grain cart of claim 17, wherein the theft detection system further comprises a short-range data communication module coupled to the controller, and the controller is further configured to receive the offload trailer identity from a portable communication device of an operator of a tractor pulling the grain cart, the receiving by way of the short-range data communication module.

22. The grain cart of claim 12, wherein the controller is further configured to:
   use the sensing device to continually monitor a cumulative weight value of indicative of weight of grain in the grain bin; and send an alarm to the tracking system if grain is offloaded from the grain bin in an absence of receiving an offload trailer identity.

23. A grain cart for transferring grain in a harvesting operation, the grain cart comprising:
a frame;
a grain bin carried by the frame;
a weight sensor mounted between the frame and the grain bin, the weight sensor configured to determine a weight value indicative of weight of grain in the grain bin; and
a theft detection system coupled to the grain bin, the theft detection system comprising:
a controller coupled to the weight sensor, the controller configured to:
receive a harvester identity of a harvesting machine;
determine a first weight value indicative of weight of grain onboarded into the grain bin from the harvesting machine, the determination using the weight sensor;
receive, when the grain is offloaded to a trailer, a second weight first weight value indicative of weight of grain offloaded from the grain bin to the trailer;
receive a trailer identity of the trailer;
encrypt information corresponding to the first weight value, the second weight value, the harvester identity, and the trailer identity; and
transmit the encrypted information.

24. The grain cart of claim 23, wherein the theft detection system further comprises a camera system operatively coupled to the controller, and the controller is further configured to read identifying indicia of the harvesting machine and the trailer by way of the camera system.

25. The grain cart of claim 23, wherein the theft detection system further comprises a satellite data communication module, and the controller is further configured to transmit the encrypted information by way of the satellite data communication module.

26. The grain cart of claim 23, wherein the theft detection system further comprises a short-range data communication module coupled to the controller, and the controller is further configured to receive the harvester identity and the trailer identity, the receiving by way of the short-range data communication module.

* * * * *